(12) United States Patent  
Peng et al.

(10) Patent No.: US 9,311,920 B2  
(45) Date of Patent: Apr. 12, 2016

(54) VOICE PROCESSING METHOD, APPARATUS, AND SYSTEM

(71) Applicant: TENCENT TECHNOLOGY (SHENZHEN) COMPANY LIMITED, Shenzhen (CN)

(72) Inventors: Yuanjiang Peng, Shenzhen (CN); Hong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/584,266

(22) Filed: Dec. 29, 2014

(65) Prior Publication Data

US 2015/0112668 A1    Apr. 23, 2015

Related U.S. Application Data

(63) Continuation of application No. PCT/CN2014/076090, filed on Apr. 24, 2014.

(30) Foreign Application Priority Data

Jun. 6, 2013    (CN) .......................... 2013 1 0222683

(51) Int. Cl.
*G10L 19/002* (2013.01)
*G10L 19/00* (2013.01)
*H04M 3/56* (2006.01)
(Continued)

(52) U.S. Cl.
CPC ............ *G10L 19/00* (2013.01); *H04L 65/1069* (2013.01); *H04L 65/602* (2013.01); *H04L 65/80* (2013.01); *H04M 3/56* (2013.01); *G10L 25/84* (2013.01)

(58) Field of Classification Search
USPC .................................. 704/201, 229, 500–504
See application file for complete search history.

(56) References Cited

U.S. PATENT DOCUMENTS

| | | | | |
|---|---|---|---|---|
| 7,245,721 | B1 * | 7/2007 | Jones et al. | ................... 380/237 |
| 2009/0248402 | A1 * | 10/2009 | Ito et al. | ........................ 704/201 |
| 2010/0241435 | A1 * | 9/2010 | Aoyagi et al. | ................ 704/500 |

(Continued)

FOREIGN PATENT DOCUMENTS

| | | | | |
|---|---|---|---|---|
| CN | 1845573 A | * | 10/2006 | .............. H04M 3/56 |
| CN | 101110868 A | | 1/2008 | |

(Continued)

OTHER PUBLICATIONS

The World Intellectual Property Organization (WIPO) International Search Report for PCT/CN2014/076090 Aug. 1, 2014.
The State Intellectual Property Office of the People's Republic of China (SIPO) Office Action 1 for 201310222683.0 Mar. 5, 2014.

(Continued)

*Primary Examiner* — Abul Azad
(74) *Attorney, Agent, or Firm* — Anova Law Group, PLLC

(57) ABSTRACT

Methods, apparatus, and systems for voice processing are provided herein. An exemplary method can be implemented by a terminal. A voice bit stream to be sent can be obtained. Voice control information corresponding to the voice bit stream to be sent can be obtained. The voice control information can be used for a voice server to determine a voice-mixing strategy. The voice bit stream and the voice control information can be sent to the voice server. At least one voice bit stream, returned by the voice server based on the voice-mixing strategy, can be received. The at least one voice bit stream can be outputted.

26 Claims, 6 Drawing Sheets

(51) Int. Cl.
*H04L 29/06* (2006.01)
*G10L 25/84* (2013.01)

(56) References Cited

U.S. PATENT DOCUMENTS

2013/0151242 A1* 6/2013 Kim .............................. 704/201
2014/0219478 A1* 8/2014 Takahashi et al. ............ 381/119

FOREIGN PATENT DOCUMENTS

CN 101378430 A 3/2009
CN 103327014 A 9/2013

OTHER PUBLICATIONS

The State Intellectual Property Office of the People's Republic of China (SIPO) Office Action 2 for 201310222683.0 Jul. 3, 2014.

* cited by examiner

VOICE PROCESSING METHOD, APPARATUS, AND SYSTEM

CROSS-REFERENCES TO RELATED APPLICATIONS

This application is a continuation application of PCT Patent Application No. PCT/CN2014/076090, filed on Apr. 24, 2014, which claims priority to Chinese Patent Application No. 201310222683.0, filed on Jun. 6, 2013, the entire contents of which are incorporated herein by reference.

FIELD OF THE DISCLOSURE

The present disclosure generally relates to voice processing technology and, more particularly, relates to methods, apparatus, and systems for voice processing.

BACKGROUND

In a voice processing system, in order to support multi-party voice communication, a voice mixing process often needs to be performed on voices from multiple channels. Multi-channel voice mixing refers to a method or process for superimposing waveforms of voices from multiple channels upon each other, to form a single channel of voice. The simplest voice mixing is to directly add together all original waveforms of voices (e.g., pulse-code modulation (PCM) streams) from input channels to form one voice PCM stream after the voice mixing.

However, in a practical multi-channel voice mixing system, there are usually a large number of input channels that participate in the voice mixing. In this case, simply, directly adding together voice PCM streams from all input channels can cause a series of problems such as increased background noise and output overflow. Therefore, a multi-channel voice mixing system often selects inputted voices from a small number of channels (usually 2 to 5 channels) at a time for the voice mixing, according to a certain voice-mixing strategy (e.g., a first voice-mixing strategy), in order to minimize problems such as increased background noise and output overflow.

In a voice communication system, based on different locations for voice mixing, there are two mixing modes including server voice mixing and terminal voice mixing. The server voice mixing has relatively high voice mixing quality, but the voice mixing process consumes significant resources. Especially when there are a great number of voice users, the voice server can be overwhelmed. Terminal voice mixing can reduce resource load on the server, but has relatively low voice mixing quality and cannot meet the high quality requirements for occasions such as audio/video conferences.

BRIEF SUMMARY OF THE DISCLOSURE

One aspect of the present disclosure includes a voice processing method. An exemplary method can be implemented by a terminal. A voice bit stream to be sent can be obtained. Voice control information corresponding to the voice bit stream to be sent can be obtained. The voice control information can be used for a voice server to determine a voice-mixing strategy. The voice bit stream and the voice control information can be sent to the voice server. At least one voice bit stream, returned by the voice server based on the voice-mixing strategy, can be received. The at least one voice bit stream can be outputted.

Another aspect of the present disclosure includes a voice processing method implemented by a voice server. In an exemplary method, from each terminal of a plurality of terminals, a voice bit stream and voice control information used for the voice server to determine a voice-mixing strategy can be received. The voice-mixing strategy can be generated by generating a first voice-mixing strategy and a second voice-mixing strategy according to the voice control information received from the each terminal. According to the first voice-mixing strategy and respectively for the each terminal of the plurality of terminals, multiple voice bit streams that need a voice mixing process can be selected. According to the second voice-mixing strategy, the multiple voice bit streams that need the voice mixing process can be returned to a corresponding terminal of the plurality of terminals, or the voice mixing process can be performed on the multiple voice bit streams that need the voice mixing process to generate a mixed voice bit stream and the mixed voice bit stream can be returned to the corresponding terminal.

Another aspect of the present disclosure includes A voice processing terminal apparatus. The apparatus can include a first obtaining unit, a second obtaining unit, a sending unit, a receiving unit, and an output unit. The first obtaining unit can be configured to obtain a voice bit stream to be sent. The second obtaining unit can be configured to obtain voice control information corresponding to the voice bit stream to be sent. The voice control information can be used for a voice server to determine a voice-mixing strategy. The sending unit can be configured to send the voice bit stream and the voice control information to the voice server. The receiving unit can be configured to receive at least one voice bit stream returned by the voice server based on the voice-mixing strategy. The output unit can be configured to output the at least one voice bit stream.

Another aspect of the present disclosure includes a voice processing server apparatus. The voice processing server apparatus can be implemented on a voice server, and can include a receiving unit, a voice-mixing-strategy generation unit, a selection unit, and a voice-mixing processing unit. The receiving unit can be configured to receive, from each terminal of a plurality of terminals, a voice bit stream and voice control information used for a voice server to determine a voice-mixing strategy. The voice-mixing-strategy generation unit can be configured to generate the voice-mixing strategy by generating a first voice-mixing strategy and a second voice-mixing strategy according to the voice control information received from the each terminal. The selection unit can be configured to select multiple voice bit streams that need a voice mixing process, according to the first voice-mixing strategy and respectively for the each terminal of the plurality of terminals. The voice-mixing processing unit can be configured to, according to the second voice-mixing strategy, return the multiple voice bit streams that need the voice mixing process to a corresponding terminal of the plurality of terminals, or to perform the voice mixing process on the multiple voice bit streams that need the voice mixing process to generate a mixed voice bit stream and to return the mixed voice bit stream to the corresponding terminal.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the disclosure.

DETAILED DESCRIPTION

Reference will now be made in detail to exemplary embodiments of the disclosure, which are illustrated in the accompanying drawings.

Figure 1:
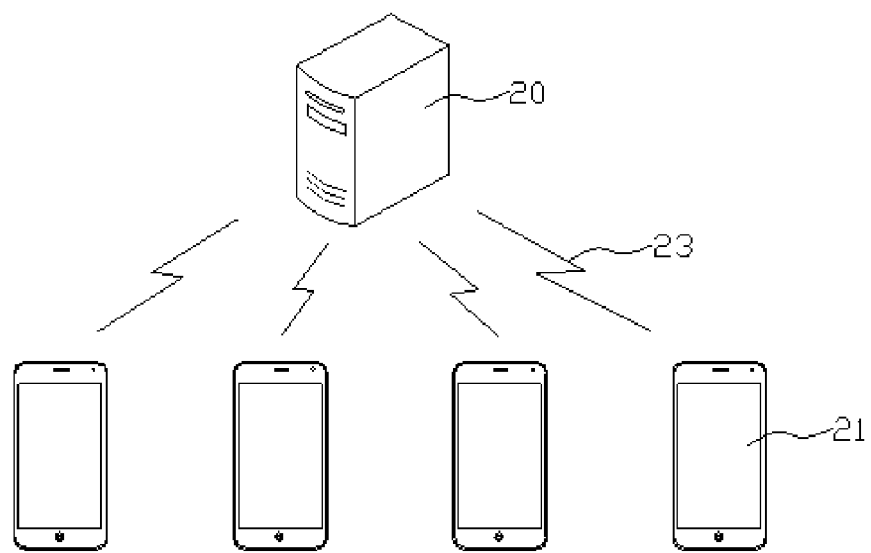
FIG. 1 depicts an exemplary operation environment of voice processing methods, apparatus and systems in accordance with various disclosed embodiments.

Various embodiments provide voice processing methods, apparatus, and systems. FIG. 1 depicts an exemplary operation environment of voice processing methods, apparatus and systems in accordance with various disclosed embodiments. As shown in FIG. 1, a plurality of terminals 21 can respectively communicate with a voice server 22 via a network 23. The network 23 can include the Internet, a local area network (LAN), a mobile communication network, or any other types of computer networks or telecommunication networks, either wired or wireless.

The voice server 22 may refer to one or more server computers configured to provide certain server functionalities, e.g., receiving/sending voice bit streams, processing voice, mixing voice. The voice server 22 may also include one or more processors to execute computer programs in parallel.

Figure 10:
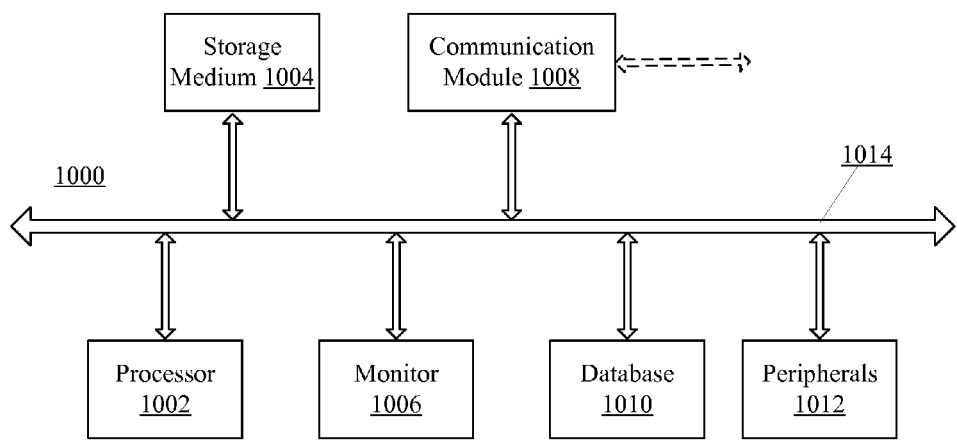
FIG. 10 depicts an exemplary computing system consistent with the disclosed embodiments.

The voice server 22 may be implemented on any appropriate computing platform. FIG. 10 shows a block diagram of an exemplary computing system 1000 (or computer system) capable of implementing the voice server 22. As shown in FIG. 10, the exemplary computer system 1000 may include a processor 1002, a storage medium 1004, a monitor 1006, a communication module 1008, a database 1010, peripherals 1012, and one or more bus 1014 to couple the devices together. Certain devices may be omitted and other devices may be included.

The processor 1002 can include any appropriate processor or processors. Further, the processor 1002 can include multiple cores for multi-thread or parallel processing. The storage medium 1004 may include memory modules. e.g., Read-Only Memory (ROM), Random Access Memory (RAM), and flash memory modules, and mass storages, e.g., CD-ROM, U-disk, removable hard disk, etc. The storage medium 1004 may store computer programs for implementing various processes (e.g., obtaining voice bit stream, generating voice mixing strategy, etc.), when executed by the processor 1002.

The monitor 1006 may include display devices for displaying contents in the computing system 1000. The peripherals 1012 may include I/O devices such as keyboard and mouse.

Further, the communication module 1008 may include network devices for establishing connections through the network 23. The database 1010 may include one or more databases for storing certain data and for performing certain operations on the stored data, e.g., storing programs for mixing voice or for generating voice mixing strategies, etc.

The terminal 21 can include any appropriate client-side computing device, e.g., a personal computer (PC) (e.g., a desktop computer or a notebook computer), a work station computer, a mobile terminal (e.g., a smart phone or a personal digital assistant), a hand-held computing device (e.g., a tablet PC), etc. One or more smart operating systems can be installed on the terminal 21 and run on the terminal 21.

Figure 2:
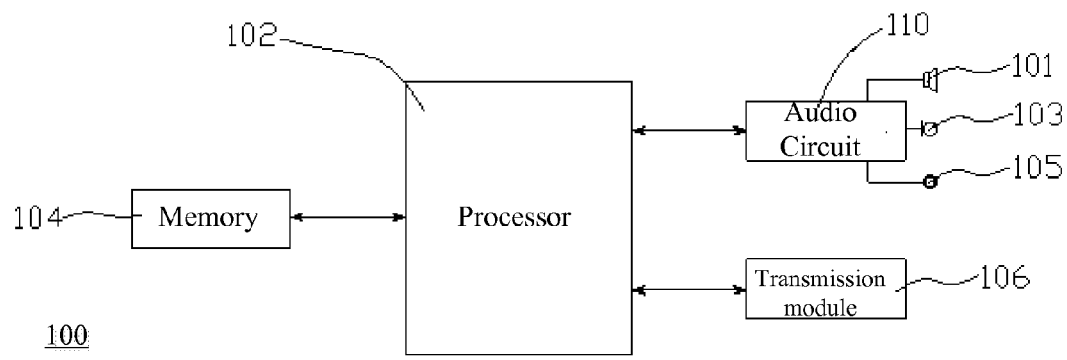
FIG. 2 depicts a structure diagram of an exemplary terminal in accordance with various disclosed embodiments.

The terminal 21 may be configured to provide structures and functions for certain actions and operations. For example, FIG. 2 depicts a structure diagram of an exemplary terminal in accordance with various disclosed embodiments. As an electronic device 100 shown in FIG. 2, the terminal 21 can include one or more processors 102 (For illustrative purposes, one processor 102 is shown in FIG. 2), a memory 104, a transmission module 106, and an audio circuit 110. The structure of the terminal shown in FIG. 2 does not limit the terminal 21 according to various embodiments. More or less components than the components as shown in FIG. 2 can be included in the terminal 21. Certain components can be combined. Components arrangements different from FIG. 2 can be used.

The memory 104 is configured to store software programs and/or modules, including, e.g. software programs and/or modules corresponding to the voice processing methods, apparatus and systems as disclosed in various embodiments. By running or executing the software programs and/or modules stored in the memory 104, and by retrieving data stored in the memory 104, the processor 102 can perform various functions and process data. The memory 104 can include high-speed RAM and/or non-volatile memory, e.g., one or more of magnetic storage devices, flash memory devices, and/or other non-volatile solid-state memory devices. In various embodiments, the memory 104 may further include a memory remotely located from the processor 102. In those cases, a remote memory 104 can be remotely connected to the electronic device 100 via a network. The network can include, but are not limited to, the Internet, an intranet, a local area network, a mobile communication network, and a combination thereof.

The transmission module 106 is configured to receive or transmit data via a network. For example, the network may include a wired network and/or a wireless network. In one example, the transmission module 106 can include a network interface controller (NIC). The NIC can be connected with other network devices (e.g. routers, modems, etc.) via a network cable, such that the NIC can communicate with the Internet.

In one example, the transmission module 106 can include a radio frequency (RF) module configured to receive and transmit electromagnetic waves. Thus, conversion between the electromagnetic waves and electrical signals can be accomplished, such that the transmission module 106 can communicate with communication networks or other communication devices. The RF module may include any suitable circuit elements that perform the functions of the RF module, including, e.g., an antenna, an RF transceiver, a digital signal processor, an encryption/decryption chip, a subscriber identity module (SIM) card, memory, etc. The RF module can communicate with various networks including, e.g., the Internet, intranet, wireless communication network, or can communicate with other devices via wireless networks.

The wireless networks can include cellular telephone networks, wireless LAN, and/or metropolitan area network (MAN). The wireless networks can use various communication standards, protocols and technologies, including, but not limited to, Global System for Mobile Communication (GSM). Enhanced Data GSM Environment (EDGE), wideband code division multiple access (W-CDMA), code division access (CDMA), time division multiple access (TDMA), Wireless Fidelity (WiFi) (e.g., the American Institute of Electrical and Electronics engineers standard IEEE 802.11a, IEEE 802.11b, IEEE802.11g, and/or IEEE 802.11n), Voice over internet protocol (VoIP), Worldwide Interoperability for Microwave Access (Wi-Max), any other suitable protocols for email, instant messaging and short message, and/or any other suitable communication protocols.

The audio circuit 110, coupled with a speaker 101, an audio jack 103, and a microphone 105 can provide an audio interface between a user and the electronic device 100. For example, the audio circuit 110 is configured to receive audio data from the processor 102, convert the audio data to an electrical signal, and transmit the electrical signal to the speaker 101. The speaker 101 is configured to convert the electrical signal to an audio signal output (e.g., sound waves that can be heard by human ear). On the other hand, the audio circuit 110 is configured to receive an electrical signal from the microphone 105, convert the electrical signal to audio data, and transmit the audio data to the processor 102 for further processing. In certain examples, the audio data can be received from the memory 104 or the transmission module 106. In addition, the audio data can be stored in the memory 104 for further processing, or be transmitted via the transmission module 106.

Figure 3:
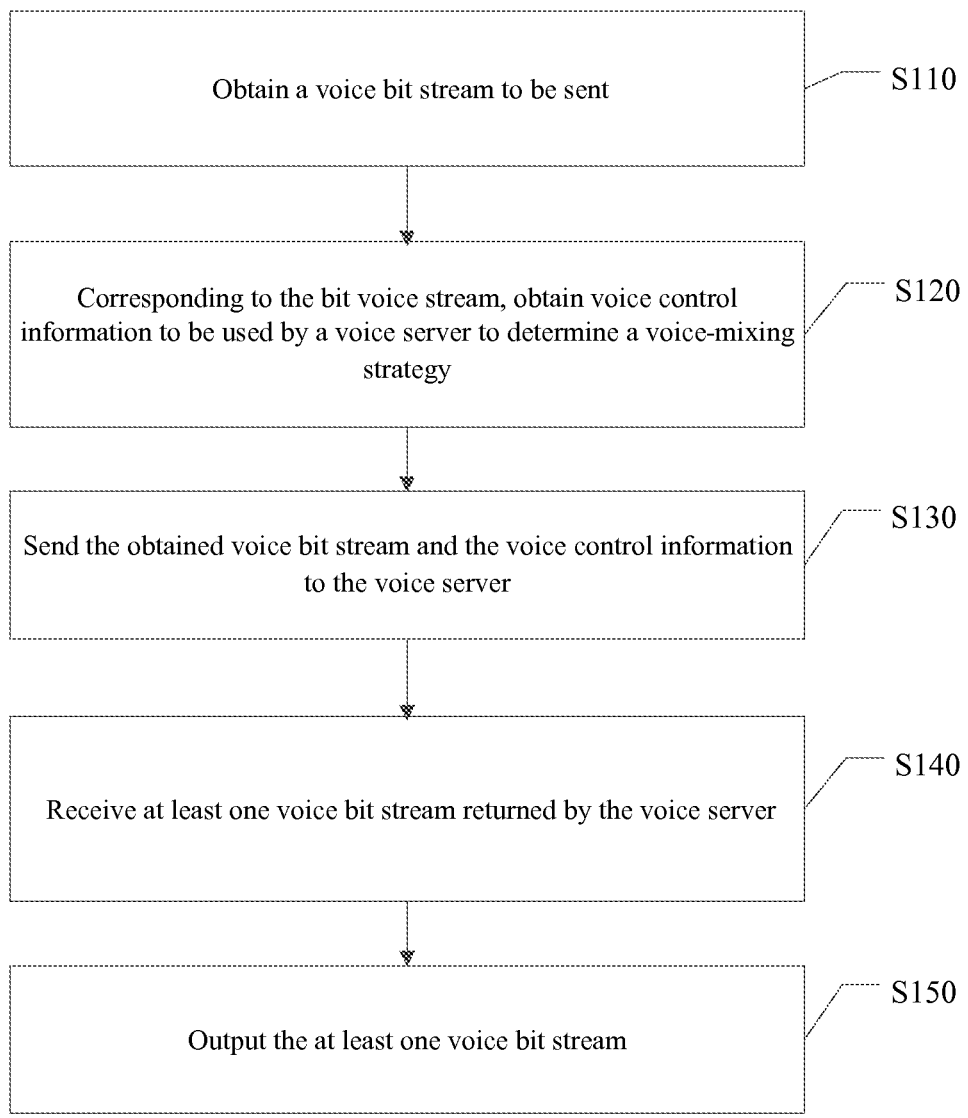
FIG. 3 depicts a flow diagram of an exemplary voice processing method in accordance with various disclosed embodiments.

FIG. 3 depicts a flow diagram of an exemplary voice processing method in accordance with various disclosed embodiments. The exemplary voice processing method can be implemented by the terminal 21. As shown in FIG. 3, the method can include the following exemplary steps.

In Step S110, a voice bit stream to be sent is obtained. For example, in Step S110, a sound can be recorded via the microphone 105. The microphone 105 can output an analog electrical signal that needs to be first converted to a digital signal, i.e., the voice bit stream. In various embodiments, a voice bit stream can be also referred to as a voice stream, or a voice code stream. A voice bit stream can refer to any suitable type of data sequence digitally representing an audio signal.

For example, a voice bit stream, e.g., a pulse-code modulation (PCM) stream of an audio signal, can be formed by sampling, quantization, and/or encoding. Further, in order to reduce volume of the voice bit stream, the PCM stream can be compressed, e.g., compressed using Adaptive Differential Pulse Code Modulation (MSADPCM) algorithm, audio compression algorithms of International Telephone and Telegraph Consultative Committee (CCITT) (e.g., A-LAW algorithm, μ-law algorithm), Moving Pictures Experts Group (MPEG) compression algorithm, and/or any other suitable algorithms. Thus, the voice bit stream can include a PCM stream, or a voice bit stream that has been compressed using certain algorithm(s).

Further, the voice bit stream can be inputted via the microphone 105 and/or any other suitable means, without limitation. For example, the voice bit stream can be obtained by directly reading an audio file stored in the memory 104.

In Step S120, corresponding to the voice bit stream, voice control information to be used by a voice server to determine a voice-mixing strategy (or voice-mixing strategies) is obtained. The voice control information can include first voice control information directly extracted from the voice bit stream, and/or second voice control information obtained using other methods.

As used herein, unless otherwise specified, voice mixing can refer to any suitable process that accomplishes mixing of audio signals from multiple channels. In various embodiments, a voice mixing process can include mixing voice bit streams from multiple channels, i.e., mixing multiple voice bit streams, to generate a single channel of voice, e.g., a mixed voice bit stream. Voice processing can refer to any suitable process that accomplishes processing of an audio signal. In various embodiments, an audio signal can include a voice, noise, or any other suitable sounds, without limitation. The methods, apparatus, and systems in accordance with various embodiments can be used for processing any audio signals, based on needs of practical applications.

For example, the first voice control information can include, e.g., short time energy (i.e., short term amplitude energy), long time energy (i.e., long term amplitude energy), voice activity detection information, or a combination thereof. An audio signal can essentially include a discrete time signal, which can be expressed as X(n), where n represents time. Energy of the audio signal (E) can be defined as:

$$E = \Sigma X^2(n)$$

In the above formula, the upper limit and lower limit of the summation can be positive infinity and negative infinity, respectively. During actual processing, when a short time range or a long time range is used for calculation, the short time energy or the long time energy can be obtained, respectively. In actual voice processing, the short time energy can be used to distinguish between unvoiced, voiced, and mute. The long time energy can be used to indicate average energy during a long period of time. Voice activity detection is a voice processing technique used to detect whether there is a voice signal, and further, to distinguish between a normal voice and background noise, to determine whether a voice input is continuous, etc. Voice activity detection information can refer to information generated by the voice activity detection.

The second voice control information can include, e.g., the voice control information related to a current user or a current voice session (or conversation). In one embodiment, users corresponding to certain terminals can have higher rights or higher levels, and accordingly can have higher priority in voice input or voice mixing. For example, in a voice session, there can be a host among a plurality of users (or user participants) that participate in the voice session. Voice of the host can have the highest voice-mixing priority. For example, in another voice session, a user is a charged user (i.e., a user that makes a payment), and can thus have a higher voice-mixing priority relative to a free user (e.g., a user that does not make a payment).

As used herein, a session, or a voice session, can refer to a process of interactive information interchange involving audio signals. A session can include a dialogue, a conversation, a meeting, a call, etc. between two or more communicating devices (e.g., between two terminals, or a terminal and a server).

In one example, the second voice control information can further include a request that specifies voice mixing to be performed on the server side (i.e., on the server). For example, on the terminal 21, when a voice session is established or during the voice session, options can be provided for the users to select a voice session mode. When the user selects a mode that needs high voice quality, e.g., a mode of voice conferencing, the request that specifies voice mixing to be performed on the server can be included in the second voice control information.

In one embodiment, a certain current voice session can have a higher priority (e.g., voice-mixing priority) relative to other general sessions. For example, a voice session has been paid, so voice mixing quality of the session needs to be ensured, and thus voice mixing may need to be performed on the server side.

In Step S130, the obtained voice bit stream and the voice control information are sent to a voice server. For example, the voice bit stream and the voice control information can be converted to a network data packet in a predetermined format, and then sent (i.e., transmitted) to the voice server 20 via the transmission module 106. Accordingly, the voice server 20 can receive the voice bit stream and the voice control information.

In Step S140, at least one voice bit stream returned by the voice server is received. For example, after the voice server 20 receives the voice bit stream and the voice control information, the voice server 20 can perform a corresponding voice mixing process, and can then return a voice bit stream formed by the voice mixing process, or return multiple voice bit streams that have not been processed using the voice mixing process. The voice mixing process and the returning of voice bit stream(s) are further detailed above and below in the present disclosure. Accordingly, the terminal 21 can receive the voice bit stream(s) returned by the voice server 20.

In Step S150, the at least one voice bit stream is outputted. For example, the number of the voice bit streams can be determined first. When only one voice bit stream is received, it can indicate that the voice mixing process has been performed on the voice server 20, or that there is only one person at other end(s) of the current voice session. In this case, the voice bit stream can be directly decoded and outputted.

When multiple voice bit streams are received, the voice bit streams may need to be processed in a voice mixing process. In various embodiments, the voice mixing process can refer to adding together PCM streams of various voice bit streams, to generate a mixed voice bit stream. After the voice mixing process, the voice bit stream(s) (e.g., the mixed voice bit stream) can be outputted. In various embodiments, the outputting can refer to converting a voice bit stream to an analog electrical signal via the audio circuit 110 and then outputting the analog electrical signal to the speaker 101 or the audio jack 103. Thus, the user can hear an outputted sound directly or hear the outputted sound via any of headphones and/or speakers (e.g., loudspeakers) that are connected to the audio jack 103.

According to various embodiments, during a voice call, in addition to a voice bit stream sent to a voice server, voice control information to be used by the voice server to determine a voice-mixing strategy can also be sent to the voice server. Correspondingly, the voice server does not need to extract the voice control information from the voice bit stream. Burden on the voice server can thus be reduced.

Figure 4:
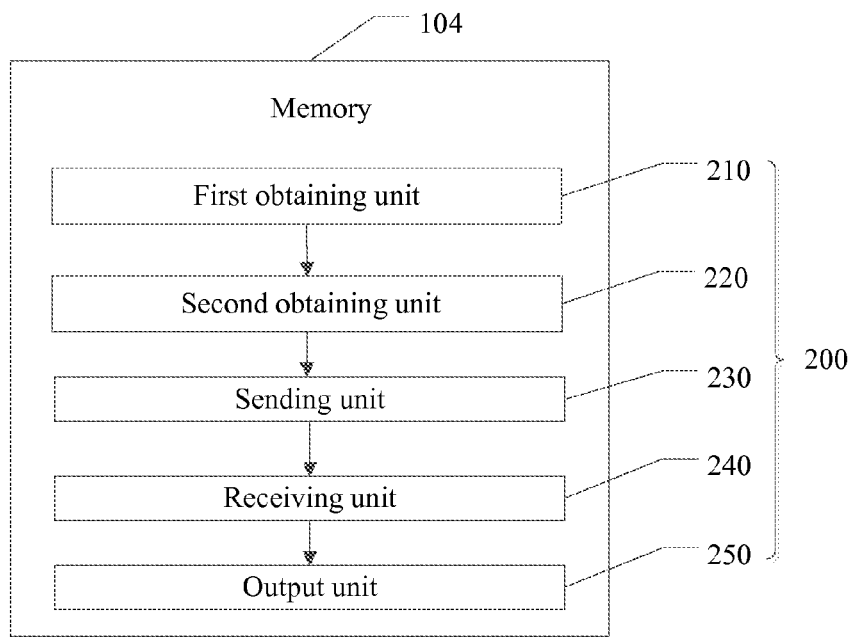
FIG. 4 depicts a structure diagram of an exemplary voice processing apparatus in accordance with various disclosed embodiments.

FIG. 4 depicts a structure diagram of an exemplary voice processing apparatus in accordance with various disclosed embodiments. As shown in FIG. 4, a voice processing apparatus 200 can include a first obtaining unit 210, a second obtaining unit 220, a sending unit 230, a receiving unit 240, and/or an output unit 250. For example, the various units described above can be stored in the memory 104 (as shown in FIG. 2), in order to be executed by the processor 102 (as shown in FIG. 2). The units are included in the memory 104 (e.g., the memory 104 as shown in FIG. 2), for illustrative purposes only. The units can be included in, and/or distributed among various components of a computer system in order to accomplish the respective functions, without limitation.

The first obtaining unit 210 is configured to obtain a voice bit stream to be sent. The second obtaining unit 220 is configured to obtain voice control information to be used by a voice server to determine a voice-mixing strategy, corresponding to the voice bit stream.

The sending unit 230 is configured to send the obtained voice bit stream and the voice control information to a voice server. The receiving unit 240 is configured to receive at least one voice bit stream returned by the voice server.

The output unit 250 is configured to output the at least one voice bit stream. For example, the number of the voice bit streams can be determined first. When only one voice bit stream is received, it can indicate that a voice mixing process has been performed on the voice server 20 (e.g., as shown in FIG. 1), or that there is only one person at other end(s) of the current voice session. In this case, the voice bit stream can be directly decoded and outputted. When multiple voice bit streams are received, the voice bit streams may need to be processed in the voice mixing process.

Thus, the voice processing apparatus 200 can further include a voice-mixing unit 260. When the at least one voice bit stream includes multiple voice bit streams, the voice-mixing unit 260 is configured to perform a voice mixing process on the at least one voice bit stream. Further details of the voice processing apparatus 200 can be similar to or the same as depicted in the voice processing methods in accordance with various embodiments (e.g., as shown in FIG. 3).

According to various embodiments, during a voice call, in addition to a voice bit stream sent to a voice server, voice control information to be used by the voice server to determine a voice-mixing strategy can also be sent to the voice server. Correspondingly, the voice server does not need to extract the voice control information from the voice bit stream. Burden on the voice server can thus be reduced.

Figure 5:
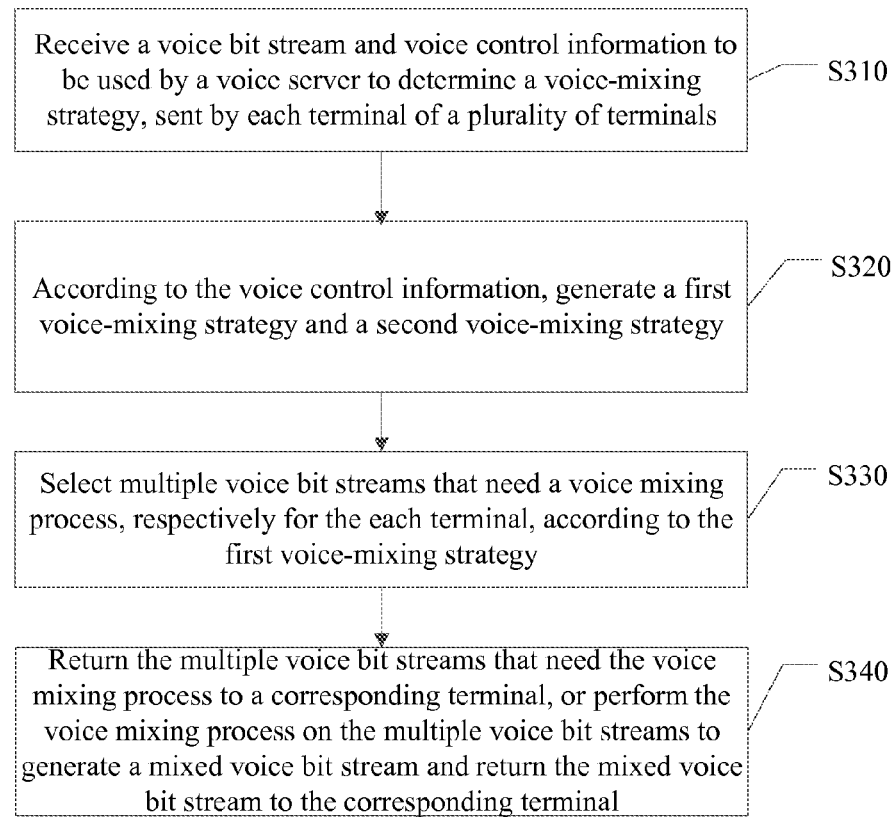
FIG. 5 depicts a flow diagram of another exemplary voice processing method in accordance with various disclosed embodiments.

FIG. 5 depicts a flow diagram of another exemplary voice processing method in accordance with various disclosed embodiments. In various embodiments, the exemplary voice processing method can be implemented by a voice server (e.g., the voice server 20 as shown in FIG. 1). As shown in FIG. 5, the method can include the following exemplary steps.

In Step S310, voice bit streams and voice control information to be used by the voice server to determine a voice-mixing strategy (or voice-mixing strategies), sent by a plurality of terminals, are received. In various embodiments, the voice control information can include first voice control information directly extracted from the voice bit stream, and/or second voice control information obtained using other methods.

For example, as shown in FIG. 1, a plurality of terminals 21 can participate in a voice session. Therefore, each terminal 21 of the plurality of terminals 21 can simultaneously send a voice bit stream and voice control information to the server 20. Contents of the voice control information can be similar to or the same as the voice control information described in the voice processing methods as disclosed in various embodiments (e.g., as shown in FIG. 3). Accordingly, the voice server 20 can receive the voice bit streams and the voice control information sent by the plurality of terminals 21.

In Step S320, according to the voice control information, a first voice-mixing strategy and a second voice-mixing strategy are generated. The first voice-mixing strategy can include information that determines which voice bit streams that a voice mixing process can be performed on.

For example, there can be five terminals participating in a voice session, and the five terminals can be respectively identified as A, B, C, D, and E. Normally, for each terminal, the voice bit streams corresponding to other terminals can be processed using a voice mixing process. For example, for terminal A, terminals B, C, D and E can be selected for the voice mixing process. For terminal B, terminals A, C, D and E can be selected for the voice mixing process, and so on. However, such method may process all the voice bit streams and consume significant resources.

The first voice-mixing strategy can be generated accordingly to the first voice control information, and/or any other suitable information, without limitation. In one example, according to the first voice control information, voice bit stream(s) that are effective voice bit stream(s) can be identified. The voice mixing process can process only the effective voice bit streams. An effective voice bit stream can refer to a voice bit stream that provides a voice input that is an effective input. The effective input can refer to, e.g., having a sound being inputted and the sound is not background sound or noise. Whether a voice input is an effective input can be determined according to information including, e.g., short time energy, long time energy, voice activity detection information, or a combination thereof. In one example, a predetermined number (e.g., ranging from about 2 to about 5) of the greatest (e.g., loudest, or having the greatest short time energy, or having the greatest long time energy) voice bit streams can be identified for the voice mixing process.

In one example, attribute information of a user corresponding to each terminal (e.g., terminal 21) can be obtained first. A voice-mixing priority of the user can be obtained according to the attribute information. For example, during a voice session, there can be a host among a plurality of participating users. Voice of the host can have the highest voice-mixing priority. Thus, the first voice-mixing strategy (or the second voice-mixing strategy) should include at least the voice bit stream from the terminal 21 logged in by the host. For other users, when a voice-mixing priority of a user exceeds a preset voice-mixing priority level, the user can be included in a list of users that must be selected, e.g., by the first voice-mixing strategy for the voice mixing process.

The second voice-mixing strategy can include information that determines whether to perform the voice mixing process on the voice server 20 or to have the voice mixing process performed by the terminal 21. In one embodiment, the second voice-mixing strategy can be generated accordingly to the second voice control information.

For example, the second voice control information (or the second voice-mixing strategy) can include a request that specifies voice mixing to be performed on the server side (i.e., on the server). Thus, the second voice-mixing strategy can specify to perform the voice mixing process on the voice server 20. Optionally, the second voice-mixing strategy can specify to perform the voice mixing process on the voice server 20 by marking (i.e., marking in the second voice-mixing strategy), or including therein a tag, flag, or any other suitable identification that can specify to perform the voice mixing process on the voice server 20. When the second voice control information does not include the request that specifies voice mixing to be performed on the server side, the second voice-mixing strategy can by default specify to have the voice mixing process performed by the terminal 21. Optionally, the second voice-mixing strategy can specify to have the voice mixing process performed by the terminal 21 by including therein a tag, flag, or any other suitable identification that can specify to have the voice mixing process performed by the terminal 21.

In one embodiment, a current voice session has been paid and thus can have a relatively high priority (i.e., voice-mixing priority). In that case, the second voice-mixing strategy can specify to perform the voice mixing process on the voice server 20.

Further, the second voice-mixing strategy is not limited to being generated accordingly to the second voice control information. For example, the voice server 20 may generate the second voice-mixing strategy according to its own hardware resource condition, and/or characteristics of the user associated with the terminal 21.

In one example, the voice server 20 can detect whether it has sufficient hardware resources. The hardware resources can include, e.g., quota of processing time of the processor, storage space, etc. When there are sufficient hardware resources, the second voice-mixing strategy can specify to perform the voice mixing process on the voice server 20. When there are no sufficient hardware resources, the second voice-mixing strategy can specify to have the voice mixing process performed by the terminal 21.

The above-described process (e.g., of generating the first voice-mixing strategy and the second voice-mixing strategy) can change dynamically. For example, at a first moment, according to the hardware resource condition (e.g., hardware resource consumption condition), the second voice-mixing strategy can specify to have the voice mixing process performed by the terminal 21. When, at a second moment, the voice server 20 detects that certain hardware resources become available, the second voice-mixing strategy can be changed to specify to have the voice mixing process performed on the voice server 20.

In one embodiment, the voice server 20 can generate (or determine) the second voice-mixing strategy according to user rights corresponding to the terminals 21. First, the user rights corresponding to the user of each terminal 21 can be obtained. When the user rights of a certain user exceed a preset level, the second voice-mixing strategy can specify to perform the voice mixing process on the voice server 20. When the user rights of the certain user do not exceed the preset level, the second voice-mixing strategy can specify to have the voice mixing process performed by the terminal 21 (e.g., the terminal 21 corresponding to the certain user).

For example, during a voice session, a plurality of participating users can be charged users, and can thus have a higher voice-mixing priority relative to a free user. In that case, the second voice-mixing strategy can specify to perform the voice mixing process on the voice server 20 (e.g., for the charged users). Otherwise, when the plurality of participating users are free users, the second voice-mixing strategy can specify to have the voice mixing process performed by the terminal 21.

The above examples of generating the first voice-mixing strategy and the second voice-mixing strategy according to actual situations are merely illustrative, and the actual situations are not limited in the present disclosure. In various embodiments, information of how to generate the first voice-mixing strategy and the second voice-mixing strategy according to actual situations can be stored in management configuration information. The management configuration information can include document(s) or file(s) that describe how to generate the first voice-mixing strategy and the second voice-mixing strategy according to the first voice control information, the second voice control information and/or other suitable information.

In Step S330, multiple voice bit streams are selected respectively for each terminal for a voice mixing process, according to the first voice-mixing strategy. In Step S340, according to the second voice-mixing strategy, the multiple voice bit streams for the voice mixing process are returned to a corresponding terminal, or the voice mixing process is performed on the multiple voice bit streams and the voice bit streams (e.g., a mixed voice bit stream) from the voice mixing process are returned to the corresponding terminal.

The above-described voice mixing process can be completed on a single-level server. That is, the voice server 20 can complete the voice mixing tasks (e.g., the voice mixing process) and directly return the voice bit streams from the voice mixing process (i.e., the voice bit streams obtained after the voice mixing process is completed) to the corresponding terminal. In various embodiments, the voice server 20 can complete the voice mixing tasks (e.g., the voice mixing process) to generate a mixed voice bit stream. Thus, the returning of the voice bit streams from the voice mixing process to the corresponding terminal can include returning the mixed voice bit stream to the corresponding terminal.

Figure 6:
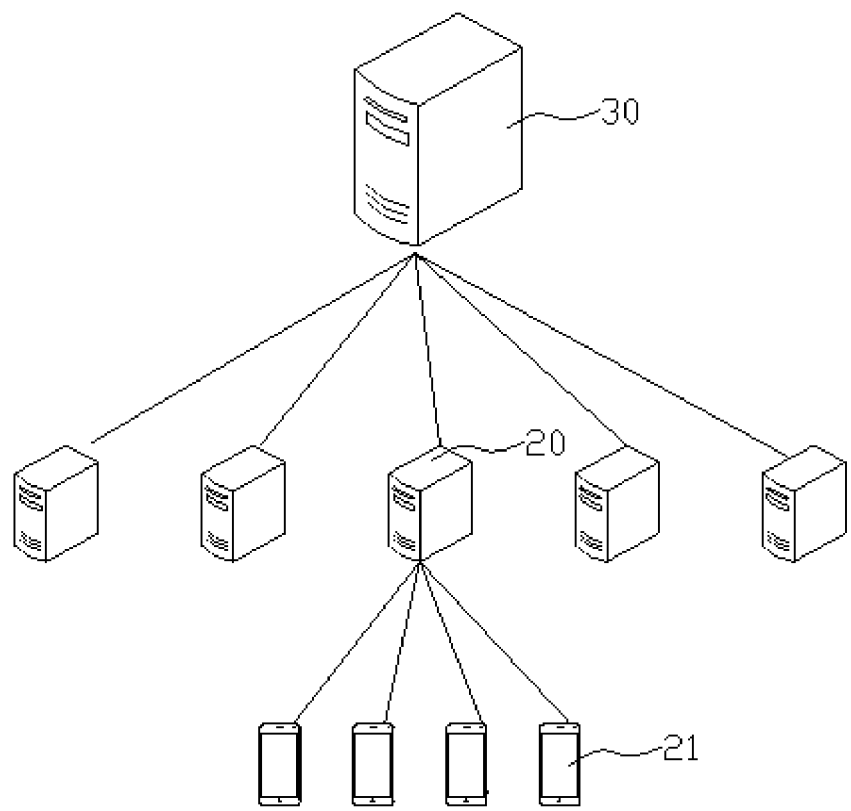
FIG. 6 depicts exemplary architecture diagram of multi-stage cascade voice mixing in accordance with various disclosed embodiments.

The voice mixing process can also be completed by a multi-stage cascade voice server. For example, FIG. 6 depicts an exemplary architecture diagram of multi-stage cascade voice mixing in accordance with various disclosed embodiments. As shown in FIG. 6, after the voice server 20 directly receives a voice (i.e., a voice bit stream) inputted by the terminal 21 and completes the voice mixing process according to the voice-mixing strategies (e.g., the first voice-mixing strategy and/or the second voice-mixing strategy), output from the voice mixing process is not directly returned to the terminal 21 and can instead become input for a superior voice server 30 of the voice server 20.

For the superior voice server 30, the voice server 20 can be equivalent to a client-side (e.g., a terminal) of the superior voice server 30. The superior voice server 30 can complete the voice mixing process using voice-mixing strategies similar to or the same as the first voice-mixing strategy and/or the second voice-mixing strategy as depicted in various disclosed embodiments. The voice bit streams from the completed voice mixing process can be returned by the superior voice server 30 to the voice server 20, and then be forwarded to the corresponding terminal 21 by the voice server 20 after certain necessary processes are completed.

Further, FIG. 6 depicts a two-stage cascade structure for illustrative purposes only. The methods, apparatus and systems depicted in various embodiments are not limited to the two-stage cascade structure. More stages can be used in the multi-stage cascade structure according needs of practical applications, without limitation.

In the voice processing methods in accordance with various embodiments, a voice server (e.g., the voice server 20 as shown in FIG. 1 or 6) can dynamically determine voice-mixing strategies according to various factors. Thus, consumption of hardware resources on the voice server can be reduced, and desired voice mixing effects for a terminal can be ensured.

Figure 7:
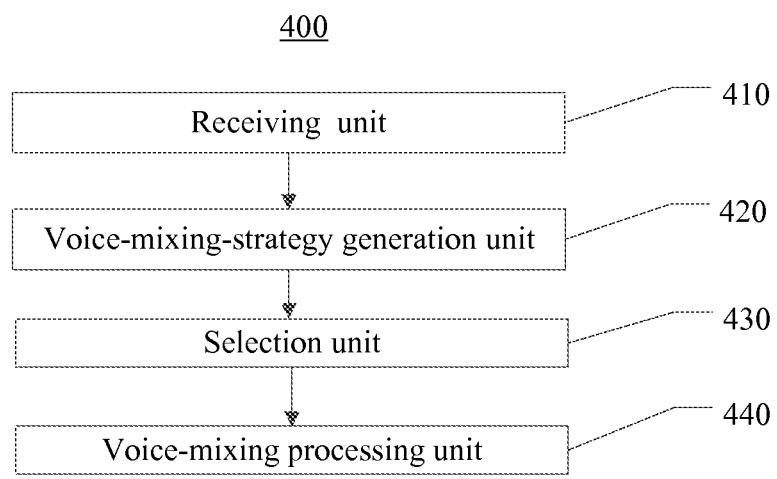
FIG. 7 depicts a structure diagram of another exemplary voice processing apparatus in accordance with various disclosed embodiments.

FIG. 7 depicts a structure diagram of another exemplary voice processing apparatus in accordance with various disclosed embodiments. The voice processing apparatus can be a server apparatus and can be implemented on a voice server. As shown in FIG. 7, the voice processing apparatus 400 can include a receiving unit 410, a voice-mixing-strategy generation unit 420, a selection unit 430, and/or a voice-mixing processing unit 440. Certain units may be omitted and other units may be included.

The receiving unit 410 is configured to receive voice bit streams and voice control information to be used by the voice server to determine a voice-mixing strategy (or voice-mixing strategies) sent by a plurality of terminals. The voice-mixing-strategy generation unit 420 is configured to generate a first voice-mixing strategy and a second voice-mixing strategy, according to the voice control information.

The selection unit 430 is configured to select multiple voice bit streams respectively for each terminal for a voice mixing process, according to the first voice-mixing strategy. The voice-mixing processing unit 440 is configured to return the multiple voice bit streams for the voice mixing process to a corresponding terminal, or to perform the voice mixing process on the multiple voice bit streams and return the voice bit streams (e.g., a mixed voice bit stream) from the voice mixing process to the corresponding terminal, according to the second voice-mixing strategy.

Further details of the voice processing apparatus 400 can be similar to or the same as depicted in the voice processing methods in accordance with various embodiments (e.g., as shown in FIG. 5). Using the voice processing apparatus in accordance with various embodiments, a voice server (e.g., the voice server 20 as shown in FIG. 1 or 6) can dynamically determine voice-mixing strategies according to various factors. Thus, consumption of hardware resources on the voice server can be reduced, and desired voice mixing effects for a terminal can be ensured.

Figure 8:
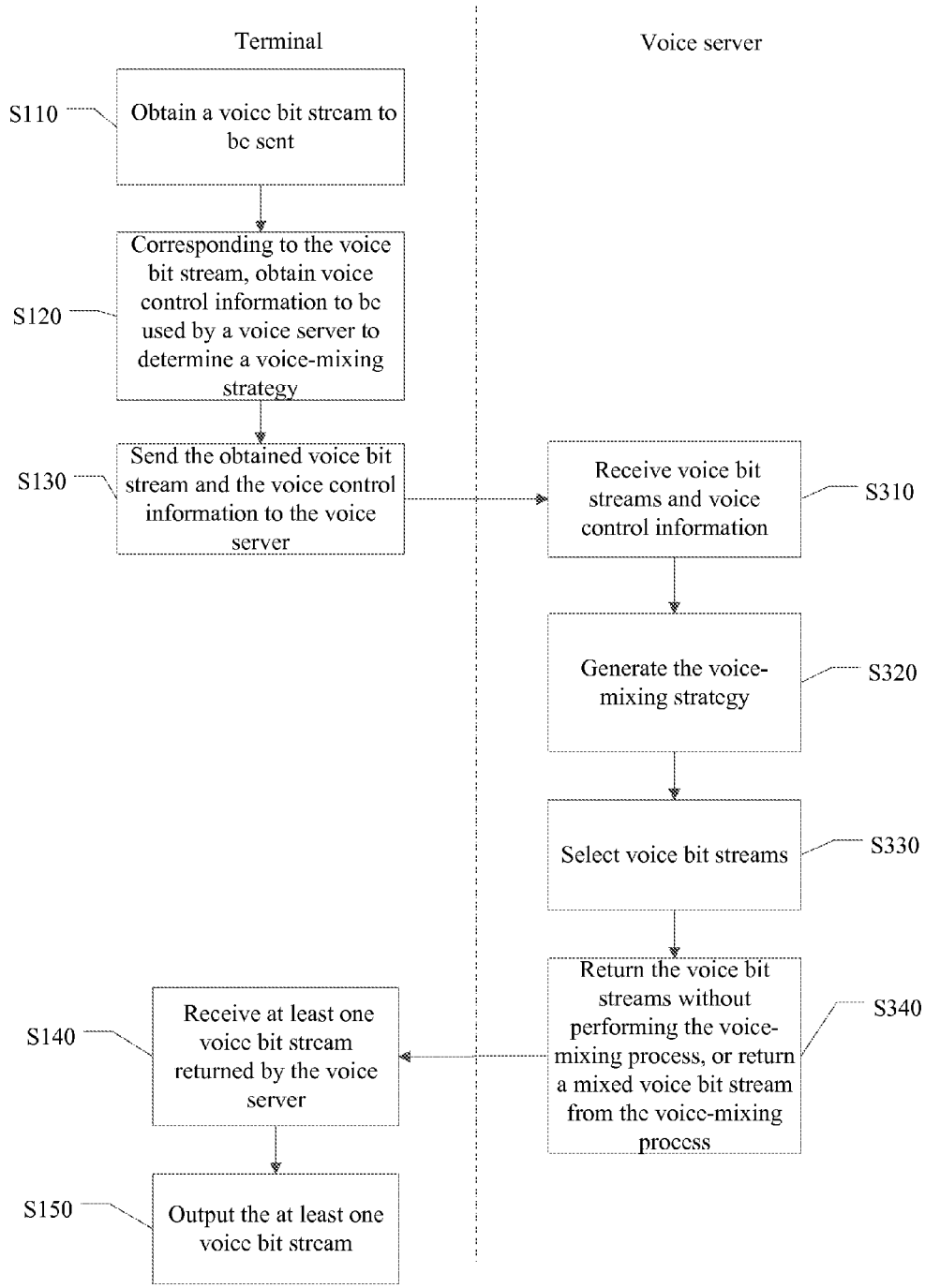
FIG. 8 depicts a flow diagram of another exemplary voice processing method in accordance with various disclosed embodiments.

FIG. 8 depicts a flow diagram of another exemplary voice processing method in accordance with various disclosed embodiments. As shown in FIG. 8, the method can include the following exemplary steps that can be implemented on a plurality of terminals.

In Step S110, a voice bit stream to be sent is obtained. In Step S120, corresponding to the voice bit stream, voice control information to be used by a voice server to determine a voice-mixing strategy (or voice-mixing strategies) is obtained.

In Step S130, the obtained voice bit stream and the voice control information are sent to a voice server. Further details of Steps S110-S130 as above can be similar to or the same as depicted in the voice processing methods in accordance with various embodiments (e.g., as shown in FIG. 3).

As shown in FIG. 8, the method can further include the following exemplary steps that can be implemented on the voice server. In Step S310, voice bit streams and corresponding voice control information respectively sent by the plurality of terminals are received.

In Step S320, according to the voice control information, a first voice-mixing strategy and a second voice-mixing strategy are generated.

In Step S330, multiple voice bit streams are selected respectively for each terminal for a voice mixing process, according to the first voice-mixing strategy. In Step S340, according to the second voice-mixing strategy, the multiple voice bit streams for the voice mixing process are returned to a corresponding terminal, or the voice mixing process is performed on the multiple voice bit streams and the voice bit streams (e.g., a mixed voice bit stream) from the voice mixing process are returned to the corresponding terminal. Further details of Steps S310-S340 as above can be similar to or the same as depicted in the voice processing methods in accordance with various embodiments (e.g., as shown in FIG. 5).

As shown in FIG. 8, after Step S340, the method can further include the following exemplary steps that can be implemented on the plurality of terminals. In Step S140, at least one voice bit stream returned by the voice server is received. In Step S150, the at least one voice bit stream is outputted.

In the voice processing methods in accordance with various embodiments, a terminal can send voice control information to be used by a voice server to determine a voice-mixing strategy to the voice server. The voice server can dynamically determine voice-mixing strategies according to various factors. Thus, consumption of hardware resources on the voice server can be reduced, and desired voice mixing effects for a terminal can be ensured.

Figure 9:
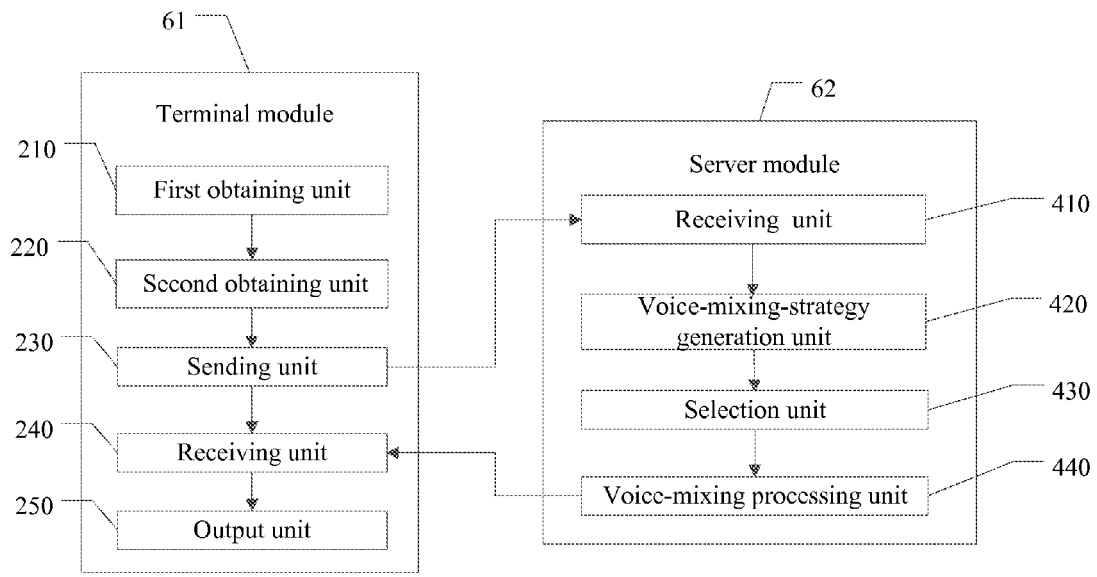
FIG. 9 depicts a structure diagram of an exemplary voice processing system in accordance with various disclosed embodiments.

FIG. 9 depicts a structure diagram of an exemplary voice processing system in accordance with various disclosed embodiments. As shown in FIG. 9, the voice processing system 1000 can include a terminal module 61 and a server module 62.

The terminal module 61 can include a first obtaining unit 210, a second obtaining unit 220, and a sending unit 230. The first obtaining unit 210 is configured to obtain a voice bit stream to be sent.

The second obtaining unit 220 is configured to obtain voice control information corresponding to the voice bit stream, to be used by the server module 62 to determine a voice-mixing strategy. The sending unit 230 is configured to send the obtained voice bit stream and the obtained voice control information to the server module 62.

The server module 62 can include a receiving unit 410, a voice-mixing-strategy generation unit 420, a selection unit 430, and/or a voice-mixing processing unit 440. The receiving unit 410 is configured to receive voice bit streams and corresponding voice control information to be used by the server module 62 to determine a voice-mixing strategy (or voice-mixing strategies) sent respectively by a plurality of terminals (e.g., a plurality of the terminal modules 61).

The voice-mixing-strategy generation unit 420 is configured to generate a first voice-mixing strategy and a second voice-mixing strategy, according to the voice control information. The selection unit 430 is configured to select multiple voice bit streams respectively for each terminal (e.g., each terminal module 61) for a voice mixing process, according to the first voice-mixing strategy. The voice-mixing processing unit 440 is configured to return the multiple voice bit streams for the voice mixing process to a corresponding terminal module 61, or to perform the voice mixing process on the multiple voice bit streams and return the voice bit streams from the voice mixing process to the corresponding terminal module 61, according to the second voice-mixing strategy.

Further, the terminal module 61 can include a receiving unit 240, and an output unit 250. The receiving unit 240 is configured to receive at least one voice bit stream returned by the voice server.

The output unit 250 is configured to output the at least one voice bit stream. Further details of various units/modules of the voice processing system as above can be similar to or the same as depicted in the voice processing apparatus in accordance with various embodiments (e.g., as shown in FIGS. 4 and/or 7).

In the voice processing systems in accordance with various embodiments, a terminal can send voice control information to be used by a voice server to determine a voice-mixing strategy to the voice server. The voice server can dynamically determine voice-mixing strategies according to various factors. Thus, consumption of hardware resources on the voice server can be reduced, and desired voice mixing effects for a terminal can be ensured.

Therefore, various embodiments also provide a voice processing method. In an exemplary method, one terminal of a plurality of terminals can obtain a voice bit stream to be sent. The one terminal can obtain voice control information corresponding to the voice bit stream to be sent. The voice control information is used for a voice server to determine a voice-mixing strategy. The one terminal can send the voice bit stream and the voice control information to the voice server. The voice server can receive, from each terminal of the plurality of terminals, a voice bit stream and corresponding voice control information. The voice server can generate the voice-mixing strategy by generating a first voice-mixing strategy and a second voice-mixing strategy according to the voice control information received from the each terminal. According to the first voice-mixing strategy and respectively for the each terminal of the plurality of terminals, the voice server can select multiple voice bit streams that need a voice mixing process. According to the second voice-mixing strategy, the voice server can return the multiple voice bit streams that need the voice mixing process to a corresponding terminal of the plurality of terminals, or perform the voice mixing process on the multiple voice bit streams that need the voice mixing process to generate a mixed voice bit stream and return the mixed voice bit stream to the corresponding terminal.

Various embodiments also provide a voice processing system, comprising a voice server. The voice server communicates with one terminal of a plurality of terminals, via a network. The one terminal includes a first obtaining unit configured to obtain a voice bit stream to be sent. The one terminal includes a second obtaining unit configured to obtain voice control information corresponding to the voice bit stream to be sent. The voice control information is used for a voice server to determine a voice-mixing strategy. The one terminal further includes a sending unit configured to send the voice bit stream and the voice control information to the voice server. The voice server includes a receiving unit configured to receive, from each terminal of the plurality of terminals, a voice bit stream and corresponding voice control information. The voice server includes a voice-mixing-strategy generation unit configured to generate the voice-mixing strategy by generating a first voice-mixing strategy and a second voice-mixing strategy according to the voice control information received from the each terminal. The voice server includes a selection unit configured to select multiple voice bit streams that need a voice mixing process, according to the first voice-mixing strategy and respectively for the each terminal of the plurality of terminals. The voice server further includes a voice-mixing processing unit configured to, according to the second voice-mixing strategy, return the multiple voice bit streams that need the voice mixing process to a corresponding terminal of the plurality of terminals, or perform the voice mixing process on the multiple voice bit streams that need the voice mixing process to generate a mixed voice bit stream and return the mixed voice bit stream to the corresponding terminal.

Further, various embodiments provides a (non-transitory) computer-readable storage medium having computer-executable instructions stored therein. The computer-readable storage medium can include nonvolatile memory, e.g., optical disk, hard disk, and/or flash memory. Computer-executable instructions can be used for computer(s) or similar computing apparatus to implement (or complete, or accomplish) the voice processing methods in accordance with various disclosed embodiments.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed methods and systems can be used in a variety of Internet applications. By using the disclosed methods and systems, one terminal of a plurality of terminals can obtain a voice bit stream to be sent. The one terminal can obtain voice control information corresponding to the voice bit stream to be sent. The voice control information is used for a voice server to determine a voice-mixing strategy. The one terminal can send the voice bit stream and the voice control information to the voice server.

Therefore, during a voice session, in addition to a voice bit stream sent to a voice server, voice control information to be used by the voice server to determine a voice-mixing strategy can also be sent to the voice server. Correspondingly, the voice server does not need to extract the voice control information from the voice bit stream. Burden on the voice server can thus be reduced.

The voice server can receive, from each terminal of the plurality of terminals, a voice bit stream and corresponding voice control information. The voice server can generate the voice-mixing strategy by generating a first voice-mixing strategy and a second voice-mixing strategy according to the voice control information received from the each terminal. According to the first voice-mixing strategy and respectively for the each terminal of the plurality of terminals, the voice server can select multiple voice bit streams that need a voice mixing process. According to the second voice-mixing strategy, the voice server can return the multiple voice bit streams that need the voice mixing process to a corresponding terminal of the plurality of terminals, or perform the voice mixing process on the multiple voice bit streams that need the voice mixing process to generate a mixed voice bit stream and return the mixed voice bit stream to the corresponding terminal.

Therefore, a voice server can dynamically determine voice-mixing strategies according to various factors. Thus, consumption of hardware resources on the voice server can be reduced, and desired voice mixing effects for a terminal can be ensured.

What is claimed is:

1. A voice processing method, implemented by a terminal, comprising:
   obtaining a voice bit stream to be sent;
   obtaining voice control information corresponding to the voice bit stream to be sent, wherein the voice control information is used for a voice server to determine a voice-mixing strategy;
   sending the voice bit stream and the voice control information to the voice server;
   receiving at least one voice bit stream returned by the voice server based on the voice-mixing strategy; and
   outputting the at least one voice bit stream;
   wherein
   the voice control information includes a first voice control information directly extracted from the voice bit stream and a second voice control information related to a current user or a current voice session; and
   the second voice control information includes information about whether a voice mixing process is to be performed on the voice server or on the terminal.

2. The method according to claim 1, wherein, when the at least one voice bit stream includes multiple voice bit streams, the method further includes:
   before the outputting of the at least one voice bit stream, performing a voice mixing process of the at least one voice bit stream.

3. The method according to claim 1, wherein the first voice control information includes short term amplitude energy, long term amplitude energy, voice activity detection information, or a combination thereof.

4. The method according to claim 1, further comprising:
   dynamically changing the second voice control information based on a hardware resource condition.

5. The method according to claim 4, further comprising:
   detecting, by the voice server, whether the voice server has sufficient hardware resources;
   when the hardware resources are sufficient, including a request to perform the voice mixing process on the voice server in the second voice control information; and
   when the hardware resources are insufficient, including a request to perform the voice mixing process on the terminal in the second voice control information.

6. The method according to claim 5, wherein detecting, by the voice server, whether the voice server has sufficient hardware resources further comprises:
   evaluating at least one of a processing time quota and a remaining storage space.

7. The method according to claim 1, further comprising:
   detecting a user right corresponding to the terminal;
   when the user right of the current user exceeds a preset level, including a request to perform the voice mixing process on the voice server in the second voice control information; and
   when the user right of the current user does not exceed the preset level, including a request to perform the voice mixing process on the terminal in the second voice control information.

8. The method according to claim 1, further comprising:
   when a voice session is a paid voice session or when one or more users in a voice session are paying users, including a request to perform the voice mixing process on the voice server in the second voice control information.

9. A voice processing method implemented by a voice server, comprising:
   receiving, from each terminal of a plurality of terminals, a voice bit stream and voice control information used for the voice server to determine a voice-mixing strategy;
   generating the voice-mixing strategy by generating a first voice-mixing strategy and a second voice-mixing strategy according to the voice control information received from the each terminal;
   according to the first voice-mixing strategy and respectively for the each terminal of the plurality of terminals, selecting multiple voice bit streams that need a voice mixing process; and
   according to the second voice-mixing strategy,
      returning the multiple voice bit streams that need the voice mixing process to a corresponding terminal of the plurality of terminals, or
      performing the voice mixing process on the multiple voice bit streams that need the voice mixing process to generate a mixed voice bit stream, and returning the mixed voice bit stream to the corresponding terminal wherein:
the voice control information includes a first voice control information directly extracted from the voice bit stream and a second voice control information related to a current user or a current voice session; and
the second voice control information includes information about whether a voice mixing process is to be performed on the voice server or on the terminal.

10. The method according to claim 9, wherein the generating of the second voice-mixing strategy includes:
detecting whether the voice server has sufficient hardware resources; and
when the voice server has sufficient hardware resources, marking, in the second voice-mixing strategy, to perform the voice mixing process on the voice server; or
when the voice server does not have sufficient hardware resources, marking, in the second voice-mixing strategy, to perform the voice mixing process on the corresponding terminal.

11. The method according to claim 10, further including:
when the hardware resources are detected to have been changed, changing the second voice-mixing strategy accordingly.

12. The method according to claim 9, wherein the generating of the second voice-mixing strategy includes:
detecting user rights corresponding to the each terminal; and
when the user rights of the current user exceed a preset level, marking, in the second voice-mixing strategy, to perform the voice mixing process on the voice server; or
when the user rights of the current user do not exceed the preset level, marking, in the second voice-mixing strategy, to perform the voice mixing process on the corresponding terminal.

13. The method according to claim 10, wherein detecting whether the voice server has sufficient hardware resources further comprises:
evaluating at least one of a processing time quota and a remaining storage space.

14. A voice processing terminal apparatus, comprising:
a first obtaining unit configured to obtain a voice bit stream to be sent;
a second obtaining unit configured to obtain voice control information corresponding to the voice bit stream to be sent, wherein the voice control information is used for a voice server to determine a voice-mixing strategy;
a sending unit configured to send the voice bit stream and the voice control information to the voice server;
a receiving unit configured to receive at least one voice bit stream returned by the voice server based on the voice-mixing strategy; and
an output unit configured to output the at least one voice bit stream;

wherein:
the voice control information includes a first voice control information directly extracted from the voice bit stream and a second voice control information related to a current user or a current voice session; and
the second voice control information includes information about whether a voice mixing process is to be performed on the voice server or on the voice processing terminal apparatus.

15. The apparatus according to claim 14, further including:
a voice-mixing unit configured to perform a voice mixing process of the at least one voice bit stream, when the at least one voice bit stream includes multiple voice bit streams.

16. The apparatus according to claim 14, wherein the first voice control information includes short term amplitude energy, long term amplitude energy, voice activity detection information, or a combination thereof.

17. A voice processing system including the apparatus of any claim of claims 14-15 and 16.

18. The apparatus according to claim 15, wherein the second obtaining unit is further configured to:
detect a user right corresponding to the voice processing terminal apparatus;
when the user right of a current user exceeds a preset level, including a request to perform the voice mixing process on the voice server in the second voice control information; and
when the user right of the current user does not exceed the preset level, including a request to perform the voice mixing process on the voice processing terminal apparatus in the second voice control information.

19. The apparatus according to claim 15, wherein the second obtaining unit is further configured to:
when a voice session is a paid voice session or when one or more users in a voice session are paying users, include a request to perform the voice mixing process on the voice server in the second voice control information.

20. A voice processing server apparatus, comprising:
a receiving unit configured to receive, from each terminal of a plurality of terminals, a voice bit stream and voice control information used for a voice server to determine a voice-mixing strategy;
a voice-mixing-strategy generation unit configured to generate the voice-mixing strategy by generating a first voice-mixing strategy and a second voice-mixing strategy according to the voice control information received from the each terminal;
a selection unit configured to select multiple voice bit streams that need a voice mixing process, according to the first voice-mixing strategy and respectively for the each terminal of the plurality of terminals; and
a voice-mixing processing unit configured to, according to the second voice-mixing strategy,
return the multiple voice bit streams that need the voice mixing process to a corresponding terminal of the plurality of terminals, or
perform the voice mixing process on the multiple voice bit streams that need the voice mixing process to generate a mixed voice bit stream, and return the mixed voice bit stream to the corresponding terminal;

wherein the voice control information includes first voice control information directly extracted from the voice bit stream, and the voice-mixing-strategy generation unit is further configured to generate the first voice-mixing strategy according to the first voice control information; and wherein:
the voice control information further includes second voice control information related to a current user or a current session,
the second voice control information includes information about whether a voice mixing process is to be performed on the voice server or on the terminal, and the voice-mixing-strategy generation unit is further configured to generate the second voice-mixing strategy according to the second voice control information.

21. The apparatus according to claim 20, wherein the voice-mixing-strategy generation unit is further configured to:
   detect whether the voice server has sufficient hardware resources; and
   when the voice server has sufficient hardware resources, mark, in the second voice-mixing strategy, to perform the voice mixing process on the voice server; or
   when the voice server does not have sufficient hardware resources, mark, in the second voice-mixing strategy, to perform the voice mixing process on the corresponding terminal.

22. The apparatus according to claim 21, wherein the voice-mixing-strategy generation unit is further configured to:
   when the hardware resources are detected to have been changed, change the second voice-mixing strategy correspondingly.

23. The apparatus according to claim 21, wherein the voice-mixing-strategy generation unit is further configured to:
   evaluate at least one of a processing time quota and a remaining storage space to detect whether the voice server has sufficient hardware resources.

24. The apparatus according to claim 20, wherein the voice-mixing-strategy generation unit is further configured to:
   detect user rights corresponding to the terminal; and
   when the user rights of the current user exceed a preset level, mark, in the second voice-mixing strategy, to perform the voice mixing process on the voice server; or
   when the user rights of the current user do not exceed the preset level, mark, in the second voice-mixing strategy, to perform the voice mixing process on the corresponding terminal.

25. A voice processing system including the apparatus of any claim of claims 20 and 21-24.

26. The apparatus according to claim 20, wherein the voice-mixing-strategy generation unit is further configured to:
   when a voice session is a paid voice session or when one or more users in a voice session are paying users, include a request to perform the voice mixing process on the voice server in the second voice control information.

* * * * *